Nov. 13, 1956 J. F. FOSTER 2,770,361
COTTON BOLL SEPARATOR
Filed Feb. 26, 1954
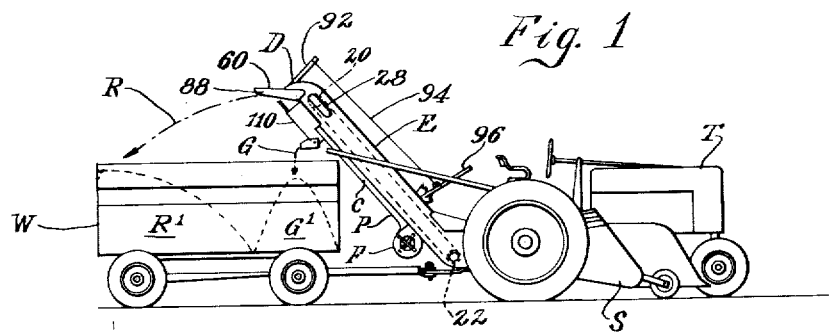
INVENTOR.
J. F. Foster United States Patent Office 2,770,361
Patented Nov. 13, 1956

2,770,361

COTTON BOLL SEPARATOR

Jack F. Foster, Moline, Ill., assignor to Deere & Company, Moline, Ill., a corporation of Illinois Application February 26, 1954, Serial No. 412,773

19 Claims. (Cl. 209—139)

This invention relates to apparatus for handling cotton bolls and more particularly to means for separating green bolls from ripe bolls.

There are at present two commercially exploited methods of picking cotton from the field. One of these is the spindle method in which a suitable machine having rotating spindles is operated over a cotton field to pick or pluck the cotton from ripe open bolls on the cotton plant. In this method of harvesting, there is a minimum accumulation of unripe or green bolls, since the picking mechanism is designed to leave the green bolls on the plant for later picking when they have ripened.

The other method is the stripper method in which the cotton harvester is equipped with means providing an elongated slot through which the plants are caused to pass as the harvesting machine travels over the field. In a machine of this type, ripe and green bolls are indiscriminately stripped from the standing plants. Although this method has certain advantages over the spindle method, there is inherent therein the problem of separating the ripe bolls from the green bolls and it is preferred that some sort of preliminary separation be accomplished in the field.

The conventional cotton stripper comprises one or more stripper units mounted on an agricultural tractor behind which is towed a wagon or trailer into which the indiscriminately intermingled ripe and green bolls are discharged by an elevator leading from the stripper unit or units.

Green bolls are relatively heavy and compact as compared with ripe bolls, primarily because their moisture content is higher, whereas the ripe bolls have a lower moisture content and the cotton bursting out of them makes them lighter and fluffier. The differences in weight and size characteristics give rise to important differences in the manner in which the two can be handled. Although it is conceivable that special equipment could be provided for handling the two types of bolls, it must be borne in mind that economy dictates a simple expedient that can be used preferably as a part of the harvesting equipment.

It was formerly conceived that the use of an air blast at the discharge end of the wagon elevator would serve to separate the ripe bolls from the green bolls, the theory being that the air blast would blow the lighter bolls farther rearwardly in the trailing wagon while the heavier green bolls would be unaffected by the air blast and would drop to the forward part of the wagon. But as a practical matter, the system does not operate in this fashion because the acceleration of the green bolls as they depart from the upper end of the conveyor substantially equals the acceleration given to the ripe bolls by the air blast, with the result that separation is not accomplished and both types of bolls are intermingled in the wagon or other receptacle.

It was later conceived that better separation of the green bolls from the ripe bolls would be accomplished by equipping the discharge end of the wagon elevator with means for retarding the travel of both types of bolls so that they would drop directly downwardly to be traversed by a blast of air just below the discharge outlet of the conveyor means. The retarding of the green bolls eliminated the problem of acceleration thereof and they would drop straight downwardly without being affected by the air blast, whereas the air blast would blow the lighter bolls to the rear part of the wagon or receptacle.

While some degree of success has been reached by this latter improvement it has been found that a higher and more complete degree of separation is desirable. The cotton bolls as they are stripped have varying amounts of moisture content dependent upon their degree of ripeness. Consequently there exist bolls having intermediate weights which while they are classified as still being green are nevertheless light enough to depart out of their straight downward path when the blast of air traverses them and moves them in somewhat the direction of the blast eventually falling somewhere between the point of traverse and the deflector. Therefore, while there exists two main streams of material, one being of the ripe bolls moving in the air blast and from the deflector and the other being of the completely green bolls continuing in the downwardly directed stream, intermediate these two streams a number of semi-ripe bolls descend.

Incidental ripe bolls are often deflected out of the air blast by coming in contact with falling green bolls, or becoming fastened to a green boll as it drops through the air blast. Often this latter condition causes the green boll to be carried out and to the rearward of the downwardly directed stream of green bolls where the combinations of green and ripe bolls are dropped at the aforementioned intermediate area between the two streams. There exists in this intermediate area therefore an intermingling of ripe and green bolls which must eventually be separated thus somewhat defeating the ultimate purpose of this method of separation.

It is one of the main objects of this invention to provide an attachment or secondary separating unit to the above described separating means comprising an inclined elongated channel mounted under the air blast that catches all bolls dropping through the air blast and deflects them toward its lower end.

It is a second main object of the invention to provide means directing a second blast of air at the channel that will serve to remove remaining incidental ripe bolls that had managed to pass through the first blast of air by driving them up the channel toward the deflector permitting the greener or heavier bolls to gravitate to the lower end of the channel.

It is another object of this invention to provide on the channel at its upper end an extension that is adjustable and being so will regulate the size of a ripe boll discharge opening that exists between the extension and the deflector and that will also vary the area and length of the channel under the air blast as may be desirable depending upon the requirements at the time.

It is a further object of this invention to provide at the lower end of the channel a discharge funnel, also adjustable, for distributing not only the green bolls gravitating from the lower end of the channel, but also those green bolls that fall directly downwardly from the discharge end of the conveyor.

It will become apparent as the description unfolds that with the attachment on the elevator there exists only two material discharge outlets one at the top of the channel through which the ripe bolls pass and one at the lower end through which the green bolls pass and that the second blast of air more fully completes the separation and consequently further reduces required handling to a minimum.

The foregoing and other important objects and desirable features inherent in and encompassed by the invention will become apparent as a preferred embodiment of the invention is disclosed in the following detailed description and accompanying sheets of drawings in which Fig. 1 is a side view of a typical cotton stripper and the trailing wagon embodying the invention.

Fig. 2 is an enlarged perspective view of the upper end of the elevator and the attachment.

Fig. 3 is a side sectional view of the upper end of the elevator with the side panel removed.

For the purposes of presenting an over-all picture of what is involved, reference will be had to Figure 1. The harvester shown is of the vehicle-mounted type comprising a stripper unit S carried at the right-hand side of a tractor T for stripping cotton from standing plants as the tractor is advanced over the field. A representative stripper harvester of this type is shown in U. S. Patent 2,533,-510. The harvester is provided at its rear end with an upwardly inclined elevator E having a discharge end D located over the box of a trailing wagon W. As the harvester progresses over the field, the stripper unit S strips both ripe and green bolls from the plants. These bolls are conveyed rearwardly to the elevator E and, while indiscriminately intermingled, are elevated to the point D for discharge into the wagon W. Omitting for the moment the details of the invention, the result is that the ripe bolls are discharged in a stream or path R and the green bolls drop through a path or stream G.

Pneumatic means P comprising a fan F and an air conduit C directs a blast of air at A to aid in the separation of the green and ripe bolls into the two paths or streams G and R, whereupon the two types of bolls are separated in the wagon W as indicated by the dotted outlines of a ripe boll pile R¹ and a green boll pile G¹.

The elevator E comprises an elongated housing made up of a top wall 10, a bottom wall 12 and side walls 14. The position of the elevator relative to the tractor is one of upward and rearward inclination. The angle of the elevator could, of course, be varied and could even be horizontal if appropriate. In any event, it is the fact that the elevator is arranged at a substantial angle to the vertical that creates the particular separation problem with which the present invention is concerned. Accordingly, the specific angle at which the elevator E is inclined is of no moment and the illustration and description in this respect should not be construed as importing any limitation into the claims appended hereto.

The elevator housing is or may be of conventional trough-like construction and contains therein conveyor means in the form of an endless belt 18 trained at its upper end about a transverse roller 20 that rotates in the direction of the arrow B (Figure 3). The lower end of the conveyor belt may be supported in any suitable manner and may be driven by power derived from the tractor. These details are unimportant and are not illustrated as to specific form. Figure 1 illustrates generally the position of the lower end of the conveyor belt 18 and suggests that a second roller 22 may serve to carry the lower end of the belt.

The upper roller 20 is carried on a shaft 24 which is adjustably positionable lengthwise of the elevator housing to accommodate changes in length of the belt 18. Figure 3 shows that the side walls 14 may be provided with elongated slots 26 in which the proximate ends of the shaft 24 may be shifted. Normally, these slots will be covered by appropriate closure means such as illustrated at 28 in Figures 1 and 2.

The bottom wall 12 of the elevator housing or trough is illustrated here as forming the top wall of the air conduit C. The structure may be otherwise than that illustrated, but the details are immaterial. The wall portion 12 terminates at a transverse rear edge 30 short of the terminal rear ends of the side walls 14 thus providing a downwardly directed, cotton-discharge outlet 32. The conduit C is completed by side walls 34 and a bottom wall or floor 38. The fan F delivers air through the conduit for discharge at the upper end of the conduit C, which is here designated as an air outlet 40. The direction of the air blast is designated by the arrow A, previously referred to in connection with the description of Figure 1. The direction of the air blast is generally parallel to the direction of movement of the upper run of the conveyor belt 18. Both of these directions are transverse to the vertical.

Figure 3 illustrates that the conveyor belt 18 is provided with a plurality of cross slats 46 for conveying the indiscriminately intermingled ripe bolls RB and green bolls GB. The two types of bolls are conveyed upwardly and of course depart from the conveyor belt at the roller 20. Thus, this portion of the conveyor means may be considered a delivery or discharge portion, the general zone of which is designated by the numeral 48. Because of the greater kinetic energy of the green bolls GB, they will depart from the conveyor belt 18 more rapidly and farther rearwardly than the ripe bolls RB. This gives rise to the separation problem discussed generally above.

Figure 2 shows the upper end of the elevator housing as constructed according to one commercial design. As stated above, it is an object of the invention to provide the attachment for association with elevator housings of a general type. In the preferred embodiment of the invention illustrated, certain modifications are made in the elevator housing to provide for the attachment. However, many variations may be indulged in and modifications of the elevator housing may not be required. The elevator housing has provided in the side walls 14 arcuate slots 54, the purpose of which will presently appear.

Movable parts, among which are a baffle plate 58 and a deflector 60 are also provided in the rear portion of the elevator. The baffle plate is of generally rectangular shape and of arcuate configuration, having an upper terminal edge portion 62 and a hinge 66 secured to said edge portion 62 by any suitable means, preferably by welding.

The other leaf of the hinge 66 is welded to an upper end 50 of the top panel 10.

When the attachment is mounted in place, the baffle plate 58 extends across between the rear portions of the side walls 14 and is transverse to the common initial path along which the conveyor belt 18 moves the indiscriminately intermingled ripe and green bolls. The arcuate shape of the baffle permits the inner surface of the baffle to be arranged in deflecting relationship to the lines of departure of the green bolls and ripe bolls from the conveyor belt 18. As shown in Figure 3, the baffle plate is disposed just rearwardly of the roller 20 of the conveyor means and is above the discharge outlet 32 provided by the termination of the conveyor housing bottom wall 12 short of the rear ends of the side walls 14.

Opposite side edges of the baffle plate 58 are provided respectively with apertured ears 74 for receiving adjustable securing means 78. These means cooperate with the arcuate slots 54 in the rear portions of the elevator housing side walls 14 and provide for fixing any selected position of adjustment of the baffle plate 58 about the transverse pivot axis provided by the hinge 66.

The lower terminal edge portion of the baffle plate 58 has a transverse hinge 82, one leaf of which is suitably secured, as by welding, to the forward edge portion of the deflector 60. This deflector is in the form of a tunnel or inverted trough having an elongated top part 86 and side parts 88. The deflector is, of course, articulated relative to the baffle plate 58 by means of the hinge 82. The top part has rigidly secured to a forward portion thereof an upstanding arm 92 having an apertured upper end to which a control rope 94 may be attached. As shown in Figure 1, the lower end of the rope may be connected to an adjustably positionable lever 96 so that the operator on the tractor may conveniently adjust the deflector 60 relative to the baffle plate 58.

The secondary separating unit comprises an inclined elongated channel 110 having a laterally disposed bottom plate member 111 between and fixed to a pair of vertical and parallel side members 112. The upper portions of the side members 112 are secured to opposite side walls of the elevator E and conduit C respectively in depending relationship by detachable bolt and nut means 114. The side members 112 extend forwardly of the bottom member 111 where they are cross connected by an end member 115 having an upper edge adjacent to the floor 38 of the conduit C and a lower horizontal edge disposed between the lower edges of the side member 112 and forms with said lower edges and the lower edge of the bottom member 111 a green boll discharge opening 117.

As shown in the drawings the channel 110 is mounted on the upper rear portion of the elevator E and directly under the blast of air A issuing from the air discharge outlet 40 and extends upwardly in proximity to the deflector 60.

An extension part 120 is mounted on the upper end of the bottom plate member 111. Oppositely arranged apertures 121 in the part 120 in conjunction with the bolt and nut combination 122 mounted on the bottom member 111 serves as adjustable connecting means between the part 120 and member 111 and permits adjustments of the part 120 toward or away from the deflector 60 to vary the size of a pipe boll discharge opening 130 defined by the upper edge of the part 120 and the deflector 60.

A second air discharge outlet 127 is in the floor 38 of the air conduit C rearwardly of the end member 115. A baffle 123 fixed to a conduit crossing shaft 124 extending through the conduit side panels 34 and disposed within the conduit C serves as redirecting means diverting a portion of the air blast in the conduit C and redirecting it through the outlet 127 as an additional blast of air traversing the stream of green material. Adjustable control means in the form of a notched sector 125 and an arm 126 fixed to the shaft 124 outward of the conduit side walls 34 is available to set the baffle 123 at the desired position.

Mounted for vertically swingable adjustment and below the green boll discharge opening 117 is an adjustable discharge device in the form of a spout 131. Position of the spout is maintained by the locking bolt and nut combinations 132.

The detailed operation of the separating units will now be described, having reference primarily to Figure 3. Since the roller 20 rotates in the direction of the arrow B, the upper run of the conveyor belt 18 will carry the indiscriminately intermingled ripe and green bolls along what may be termed a common initial path I. As the belt wraps around the roller, both types of bolls depart from the conveyor in the general zone 48. Because of the kinetic energy of the heavier green bolls GB, their departure will be accelerated over that of the ripe bolls RB and they will thus travel more rapidly and farther rearwardly than the ripe bolls. However, the baffle plate 58 retards the travel of the green bolls and the inner arcuate surface of the baffle plate presents a target against which the green bolls impinge to be directed downwardly as indicated by the heavy dotted line G. Of course, not all bolls will impinge at the same point but the dotted line is a general indication of what occurs. The ripe bolls may or may not impinge on the inner arcuate surface of the baffle plate 58, depending upon their condition of ripeness but if fully ripened it is expected that they will depart from the zone 48 more slowly and closer to the roller 20 than the green bolls GB, traveling somewhat in the arcuate path $R^2$. In the zone or area just to the rear of the roller 20, the ripe-boll path $R^2$ is parallel to or intermingled with the green-boll downward path so that it may be said that the two bolls are still intermingled in a downwardly moving stream. The green bolls, being heavier, will for the most part move downwardly without being substantially affected by the air blast A from the air outlet 40, and conversely the lighter ripe bolls will for the most part be materially affected by the air blast A and accordingly will depart from the common path at about the point $R^3$ to move rearwardly and upwardly as at $R^4$ to ultimately be deflected by the undersurface of the deflector to travel ultimately in the final path or stream R for deposit in the wagon (Figure 1).

While the degree of separation by the above method is high percentagewise, nevertheless a considerable quantity of intermingled green and ripe bolls remain and for the reasons previously described drop out of the air blast prior to reaching the deflector and fall on the inclined channel to be deflected downwardly toward its lower end. Prior to reaching the lower end, these bolls are traversed by the additional blast of air $A^2$ directed at the bottom plate causing a further separation of the light bolls from the green bolls and driving the former up the plate to the ripe boll discharge opening 130 while the later proceeds downwardly to the green boll discharge outlet 117.

As shown in Figure 3 the additional air blast $A^2$ also traverses the green boll stream descending from the general zone 48 further separating incidental lighter material retained in the stream and driving it to the ripe boll discharge opening in the path $R^5$ shown in Fig. 3.

The discharge device 131 will receive and discharge the green bolls gravitating from the bottom member 111 to the pile $G^1$ which pile will be completely separated from the pile $R^1$ of ripe bolls.

Various other features and advantages of the invention not specifically enumerated herein will undoubtedly occur to those versed in the art, as likewise will numerous modifications and alterations in the preferred embodiment of the invention illustrated, all of which may be achieved without departing from the spirit and scope of the invention.

What is claimed is:

1. In a material-separating apparatus having an uphill conveyor housing from the upper end of which indiscriminately commingled heavier and lighter material is discharged in a downward stream and an air blast issuing from an air discharge outlet below the conveyor traverses the stream with such intensity to permit the heavier material to continue downwardly while causing the lighter material to depart from the stream and move generally in the direction of the blast and wherein a deflector mounted adjacent to the conveyor housing above and beyond the air discharge outlet above the air blast is positioned to intercept the blast containing the lighter material for redirecting the lighter material, the improvement residing in a secondary separating unit comprising: a laterally disposed plate member also inclined uphill and having upper and lower ends, a pair of side members depending from the housing and fixed to the plate member to form with the latter an elongated channel positioned under the air blast, with the lower end of the plate member traversing the material stream, and the upper end of the plate proximate to the deflector and defining therewith a discharge opening through which the lighter materials are blown by the air blast, said plate member serving to deflect toward the lower end of the plate member not only heavier material dropping through the air blast from the discharge stream but incidental lighter materials carried by the heavier materials, a part adjustably mounted on the upper end of the member for movement toward and away from the deflector to vary the size of the discharge opening, means directing an additional blast of air at the plate member so as to drive the remaining incidental lighter material up the plate member and through the discharge opening while the heavier material gravitates to the lower end of the plate member, an adjustable discharge device positioned beneath the lower end of the member for redirecting and distributing the heavier material gravitating from the plate member, and means connecting the adjustable discharge device to the secondary separating unit.

2. In a material-separating apparatus having an uphill conveyor housing from the upper end of which indiscriminately commingled heavier and lighter material is discharged in a downward stream and an air blast issuing from an air discharge outlet below the conveyor traverses the stream with such intensity to permit the heavier material to continue downwardly while causing the lighter material to depart from the stream and move generally in the direction of the blast and wherein a deflector mounted adjacent to the conveyor housing above and beyond the air discharge outlet above the air blast is positioned to intercept the blast containing the lighter material for redirecting the lighter material, the improvement residing in a secondary separating unit comprising: a laterally disposed plate member also inclined uphill and having upper and lower ends, a pair of side members depending from the housing and fixed to the plate member to form with the latter an elongated channel positioned under the air blast, with the lower end of the plate member traversing the material stream and the upper end proximate to the deflector and defining therewith a discharge opening through which the lighter materials are blown by the air blast, said plate member serving to deflect toward the lower end of the plate member not only heavier material dropping through the air blast from the discharge stream but incidental lighter materials carried by the heavier materials, means directing an additional blast of air at the plate member so as to drive the remaining incidental lighter material up the plate member and through the discharge opening while the heavier material gravitates to the lower end of the plate member, an adjustable discharge device positioned beneath the lower end of the member for redirecting and distributing the heavier material gravitating from the plate member, and means connecting the adjustable discharge device to the secondary separating unit.

3. Cotton boll-separating means for an uphill conveyor which moves indiscriminately commingled ripe and green cotton bolls in an upwardly directed path to an upper terminal end of the conveyor comprising: deflective means at the upper end in the path of the commingled cotton bolls for redirecting them in a downward stream, an upwardly directed air blast issuing from an air discharge outlet below the conveyor traversing the stream with sufficient intensity to permit the heavier green bolls to continue downwardly while causing the lighter ripe bolls to depart from the stream and move generally in the direction of the blast, a deflector mounted adjacent to the conveyor above and beyond the air discharge outlet and above the air blast and positioned to intercept the blast containing the ripe bolls for redirecting them downwardly, a laterally disposed plate member also inclined uphill and having upper and lower ends, a pair of side members depending from the conveyor and fixed to the plate member to form with the latter an elongated channel positioned under the air blast, with the upper end of the plate terminating short of the deflector and defining with the deflector a discharge opening through which the ripe bolls are blown by the air blast, said plate member serving to deflect toward the lower end of the plate member the heavier green bolls dropping through the air blast.

4. In a material-separating apparatus having an uphill conveyor housing from the upper end of which indiscriminately commingled heavier and light material is discharged in a downward stream and an air blast issuing from an air discharge outlet below the conveyor traverses the stream with sufficient intensity to permit the heavier material to continue downwardly while causing the lighter material to depart from the stream and move generally in the direction of the blast and wherein a deflector mounted adjacent to the conveyor housing above and beyond the air discharge outlet above the air blast is positioned to intercept the blast containing the lighter material for redirecting the lighter material, the improvement residing in a secondary separating unit comprising: an elongated U-shaped member including an uphill inclined bottom having upper and lower ends and further including upwardly turned sides fixed to the housing and forming a channel positioned with the bottom beneath the air blast and the upper end of said bottom proximate to the deflector and defining therewith a discharge opening through which the lighter materials are blown by the air blast, said bottom serving to catch and deflect toward its lower end not only heavier material dropping through the air blast from the discharge stream but incidental lighter materials carried by the heavier materials, a part adjustably mounted on the upper end of the member and movable toward and away from the deflector to vary the size of the discharge opening, means directing an additional blast of air at the bottom so as to drive the remaining incidental lighter material up said bottom to the discharge opening while the heavier material gravitates to the lower end of the bottom, an adjustable discharge device positioned beneath the lower end of the bottom for redirecting and distributing the heavier material gravitating from the bottom, and means connecting the device to the secondary separating unit.

5. In a material-separating apparatus having an uphill conveyor housing from the upper end of which indiscriminately commingled heavier and lighter material is discharged in a downward stream and an air blast issuing from an air discharge outlet below the conveyor traverses the stream with sufficient intensity to permit the heavier material to continue downwardly while causing the lighter material to depart from the stream and move generally in the direction of the blast and wherein a deflector mounted adjacent to the conveyor housing above and beyond the air discharge outlet above the air blast is positioned to intercept the blast containing the lighter material for redirecting the lighter material, the improvement residing in a secondary separating unit comprising: an elongated U-shaped member including an uphill inclined bottom having upper and lower ends and further including upwardly turned sides fixed to the housing and forming a channel positioned with the bottom beneath the air blast and the upper end of said bottom proximate to the deflector and defining therewith a discharge opening through which the lighter materials are blown by the air blast, said bottom serving to catch and deflect toward its lower end not only heavier material dropping through the air blast from the discharge stream but incidental lighter materials carried by the heavier materials, means directing an additional blast of air at the bottom so as to drive the remaining incidental lighter material up said bottom to the discharge opening while the heavier material gravitates to the lower end of the bottom, adjustable discharge device positioned beneath the lower end of the bottom for redirecting and distributing the heavier material gravitating from the bottom, and means connecting the device to the secondary separating unit.

6. Material-separating means for an uphill conveyor which moves indiscriminately commingled heavier and lighter material in an upwardly directed path to an upper terminal end of the conveyor comprising: deflective means at the upper end in the path of the commingled material for redirecting the material in a downward stream, an air blast issuing from an air discharge outlet below the conveyor traversing the stream with sufficient intensity to permit the heavier material to continue downwardly while causing the lighter material to depart from the stream and move generally in the direction of the blast, a deflector mounted adjacent to the upper end of the conveyor above and beyond the air discharge outlet and above the air blast and positioned to intercept the blast containing the lighter material for redirecting the lighter material downwardly, an elongated U-shaped member including an uphill inclined bottom having upper and lower ends and further including upwardly turned sides fixed to the conveyor and forming a channel positioned with the bottom beneath the air blast and the upper end of said bottom terminating short of the deflector and defining with the deflector a discharge opening through which the lighter materials are blown by the air blast, said bottom serving to catch and deflect toward its lower end heavier material dropping through the air blast from the discharge stream.

7. In a material-separating apparatus having an uphill conveyor housing from the upper end of which indiscriminately commingled heavier and lighter material is discharged in a downward stream and an air blast issuing from an air discharge outlet below the conveyor traverses the stream with sufficient intensity to permit the heavier material to continue downwardly while causing the lighter material to depart from the stream and move generally in the direction of the blast and wherein a deflector mounted adjacent to the conveyor housing above and beyond the air discharge outlet above the air blast is positioned to intercept the blast containing the lighter material for redirecting the lighter material, the improvement residing in a secondary separating unit comprising: a laterally disposed plate member having first and second ends and upwardly turned sides fixed to the housing and forming an elongated channel positioned beneath the air blast and having its first end proximate to the deflector and defining therewith a discharge opening through which the lighter materials are blown by the air blast, said channel serving to catch not only heavier material dropping through the air blast from the discharge stream but incidental lighter materials carried by the heavier material and means directing an additional blast of air at the channel and toward the discharge opening to drive the remaining incidental lighter material from the channel through the discharge opening.

8. In a material-separating apparatus having an uphill conveyor housing from the upper end of which indiscriminately commingled heavier and lighter material is discharged in a downward stream and an air blast issuing from an air discharge outlet below the conveyor traverses the stream with sufficient intensity to permit the heavier material to continue downwardly while causing the lighter material to depart from the stream and move generally in the direction of the blast and wherein a deflector mounted adjacent to the conveyor housing above and beyond the air discharge outlet above the air blast is positioned to intercept the blast containing the lighter material for redirecting the lighter material, the improvement residing in a secondary separating unit comprising: a laterally disposed plate member having first and second ends and upwardly turned sides fixed to the housing and forming an elongated channel positioned beneath the air blast and having its first end proximate to the deflector and defining therewith a discharge opening through which the lighter materials are blown by the air blast, said channel serving to catch not only heavier material dropping through the air blast from the discharge stream but incidental lighter materials carried by the heavier material, means directing an additional blast of air at the channel and toward the discharge opening to drive the remaining incidental lighter material from the channel through the discharge opening and means connected to the secondary separating unit proximate to a heavy material discharge outlet in the unit for directing the heavier material from the channel.

9. Material-separating means for an uphill conveyor which moves indiscriminately commingled heavier and lighter material in an upwardly directed path to an upper terminal end of the conveyor comprising: collective means at the upper end in the path of the commingled material for redirecting the material in a downward stream, an air blast issuing from an air discharge outlet below the conveyor traversing the stream with sufficient intensity to permit the heavier material to continue downwardly while causing the lighter material to depart from the stream and move generally in the direction of the blast, a deflector mounted adjacent to the upper end of the conveyor housing above and beyond the air discharge outlet and above the air blast and positioned to intercept the blast containing the lighter material for redirecting the lighter material downwardly, a laterally disposed plate member having first and second ends and upwardly turned sides fixed to the conveyor and forming an elongated channel positioned beneath the air blast and having its first end terminating short of the deflector and defining therewith a discharge opening through which the lighter materials are blown by the air blast, said channel serving to catch heavier material dropping through the air blast from the discharge stream and deflecting it to a heavy material discharge outlet adjacent the second end of the plate member.

10. In a material-separating apparatus having an uphill conveyor housing from the upper end of which indiscriminately commingled heavier and lighter material is discharged to gravitate in a material stream and an air blast issuing from an air discharge outlet below the conveyor traverses the stream with sufficient intensity to permit the heavier material to continue while causing the lighter material to depart from the stream generally in the direction of the blast and wherein a deflector mounted adjacent to the conveyor housing above and beyond the air discharge outlet above the air blast is positioned to intercept the blast-borne lighter material for redirecting such lighter material, the improvement residing in a secondary separating unit comprising: laterally disposed plate means also inclined uphill and disposed beneath the air blast and positioned to interrupt the downward travel of the gravitating material to catch and to deflect not only the heavier material dropping through the air blast from the discharge stream but incidental lighter materials carried by the heavier materials, means connecting the plate means to the housing, means directing an additional blast of air at the plate means so as to drive the incidental lighter material up the plate means toward the deflector while the heavier material continues to gravitate down the plate means, discharge means redirecting and distributing the heavier material gravitating from the plate means and connecting means securing the discharge means to the secondary separating unit.

11. In a material-separating apparatus having an uphill conveyor housing from the upper end of which indiscriminately commingled heavier and lighter material is discharged to gravitate in a material stream and an air blast issuing from an air discharge outlet below the conveyor traverses the stream with sufficient intensity to permit the heavier material to continue while causing the lighter material to depart from the stream generally in the direction of the blast and wherein a deflector mounted adjacent to the conveyor housing above and beyond the air discharge outlet above the air blast is positioned to intercept the blast-borne lighter material for redirecting such lighter material, the improvement residing in a secondary separating unit comprising: laterally disposed plate means disposed beneath the air blast and positioned to interrupt the downward travel of the gravitating material to catch and to deflect not only the heavier material dropping through the air blast from the discharge stream but incidental lighter materials carried by the heavier materials toward a material discharge outlet in the plate means, means connecting the plate means to the housing, and means directing an additional blast of air at the plate means so as to drive the incidental lighter material from the plate means toward the deflector.

12. In a material-separating apparatus having an uphill conveyor housing from the upper end of which indiscriminately commingled heavier and lighter material is discharged to gravitate in a material stream and an air blast issuing from an air discharge outlet below the conveyor traverses the stream with sufficient intensity to permit the heavier material to continue downwardly while causing the lighter material to depart from the stream generally in the direction of the blast and wherein a deflector mounted adjacent to the conveyor housing above and beyond the air discharge outlet above the air blast is positioned to intercept the blast containing the lighter material for redirecting the lighter material, the improvement residing in a secondary separating unit comprising: a laterally disposed plate member also inclined uphill and having upper and lower ends and so disposed that said member is beneath the air blast and has its first end proximate to the deflector and defining therewith a discharge opening through which the lighter materials are blown by the air blast, said plate member being positioned to interrupt the downward travel of the gravitating material to catch and to deflect heavier material dropping through the air blast from the discharge stream, means connecting the member to the housing, and a part adjustably mounted on the upper end of the member for movement toward and away from the deflector to vary the size of the discharge opening.

13. In a material-separating apparatus having an uphill conveyor housing from the upper end of which indiscriminately commingled heavier and lighter material is discharged to gravitate in a material stream and an air blast issuing from an air discharge outlet below the conveyor traverses the stream with sufficient intensity to permit the heavier material to continue downwardly while causing the lighter material to depart from the stream generally in the direction of the blast and wherein a deflector mounted adjacent to the conveyor housing above and beyond the air discharge outlet above the air blast is positioned to intercept the blast containing the lighter material for redirecting the lighter material, the improvement residing in a secondary separating unit comprising: a laterally disposed plate member having first and second ends disposed beneath the air blast and having its first end proximate to the deflector defining therewith a discharge opening through which the lighter materials are blown by the air blast, said plate member being positioned to interrupt the downward travel of the gravitating material to catch and to deflect heavier material dropping through the air blast from the discharge stream, and a part adjustably mounted on the first end of the member for movement toward and away from the deflector to vary the size of the discharge opening.

14. In a material-separating apparatus having an uphill conveyor housing from the upper end of which indiscriminately commingled heavier and lighter material is discharged on a downward stream and an air blast issuing through an air discharge outlet below the conveyor traverses the stream with sufficient intensity to permit the heavier material to continue downwardly while causing the lighter material to depart from the stream and move generally in the direction of the blast and wherein a deflector mounted adjacent to the conveyor housing above and beyond the air discharge outlet above the air blast is positioned to intercept the blast containing the lighter material for redirecting the lighter material, the improvement residing in a secondary separating unit comprising: a laterally disposed plate member positioned beneath the air blast serving to catch not only heavier material dropping through the air blast from the discharge stream but incidental lighter materials carried by the heavier materials, means connecting the member to the housing, redirecting means mounted in the air blast prior to its traversing the downward stream of material diverting and redirecting a portion of said blast at the plate member so as to drive the remaining incidental lighter material from the plate member toward the deflector and a material discharge outlet on the plate member for removing the heavier materials from the member as they accumulate.

15. The invention defined in claim 14 further characterized by the redirecting means comprising a secondary air discharge outlet adjacent to and below the air blast, baffle means contained in said blast redirecting a part of it toward the secondary discharge outlet and adjustable control means available to the operator and connected to the baffle means for adjusting the latter and serving to control the quantity of air and the direction of the part of the air blast passing through the secondary discharge outlet.

16. In a material-separating apparatus having an uphill conveyor housing from the upper end of which indiscriminately commingled heavier and lighter material is discharged to gravitate in a material stream and an air blast issuing from an air discharge outlet below the conveyor traverses the stream with sufficient intensity to permit the heavier material to continue while causing the lighter material to depart from the stream generally in the direction of the blast and wherein a deflector mounted adjacent the upper end of the conveyor housing above and beyond the air discharge outlet above the air blast is positioned to intercept the blast-borne lighter material for redirecting such lighter material, the improvement residing in a secondary separating unit comprising: laterally disposed plate means disposed beneath the air blast and positioned to interrupt the downward travel of the gravitating material to catch and to deflect material dropping through the air blast from the discharge stream to a material discharge outlet in the plate means, means connecting the plate means to the housing, and secondary plate means adjustably mounted on the first plate means varying the area of the first plate means under the air blast.

17. In a material-separating apparatus having an uphill conveyor housing from the upper end of which indiscriminately commingled heavier and lighter material is discharged to gravitate in a material stream and an air blast issuing from an air discharge outlet below the conveyor traverses the stream with sufficient intensity to permit the heavier material to continue while causing the lighter material to depart from the stream generally in the direction of the blast and wherein a deflector mounted adjacent to the conveyor housing above and beyond the air discharge outlet above the air blast is positioned to intercept the blast-borne lighter material for redirecting such lighter material, the improvement residing in a secondary separating unit comprising: laterally disposed plate means disposed beneath the air blast and positioned to interrupt the downward travel of the gravitating material to catch and to deflect not only the heavier material dropping through the air blast from the discharge stream but incidental lighter materials carried by the heavier materials toward a material discharge outlet in the plate means and including a portion thereon proximate to the deflector and operative with the deflector to provide an opening permitting the lighter material to pass, said plate means also including adjustable parts for varying the size of the opening, and means connecting the plate means to the housing.

18. A separating unit of the character described, comprising a U-shaped structure having opposite ends and including a bottom, opposite side members adjoining and rising from the bottom and an end member cross-connecting the side members and closing the structure at one end, leaving the structure open at its top and at its other end, said bottom having an opening therethrough adjacent to the closed end of the structure, a deflector extending beneath the bottom opening in a direction inclined downwardly and toward the open end of the structure, and means mounting the deflector on the structure including adjustable means providing for adjustment of the inclination of the deflector.

19. A separating unit of the character described, comprising a U-shaped structure having opposite ends and including a bottom, opposite side members adjoining and rising from the bottom and an end member cross-connecting the side members and closing the structure at one end, leaving the structure open at its top and at its other end, said bottom having an opening therethrough adjacent to the closed end of the structure, an extension member positioned at the open end of the structure as a continuation of the bottom, and means adjustably connecting the extension member to the structure for adjustment of said extension member toward and away from the bottom.

References Cited in the file of this patent

UNITED STATES PATENTS

| | | |
|---|---|---|
| 508,842 | Ruffin | Nov. 18, 1893 |
| 1,822,741 | Lovensen | Sept. 8, 1931 |
| 1,987,640 | Rothgarn | Jan. 15, 1935 |
| 2,257,097 | Anderson et al. | Sept. 30, 1941 |
| 2,645,821 | Fowler | July 21, 1953 |

UNITED STATES PATENT OFFICE
CERTIFICATE OF CORRECTION

Patent No. 2,770,361

November 13, 1956

Jack F. Foster

It is hereby certified that error appears in the printed specification of the above numbered patent requiring correction and that the said Letters Patent should read as corrected below.

Column 9, line 74, for "collective" read -- deflective --.

Signed and sealed this 19th day of August 1958.

(SEAL)
Attest:
KARL H. AXLINE
Attesting Officer

ROBERT C. WATSON
Commissioner of Patents